April 2, 1968     W. SCHUSTER     3,376,047
COLLAPSIBLE VEHICLE
Filed June 15, 1966     3 Sheets-Sheet 1
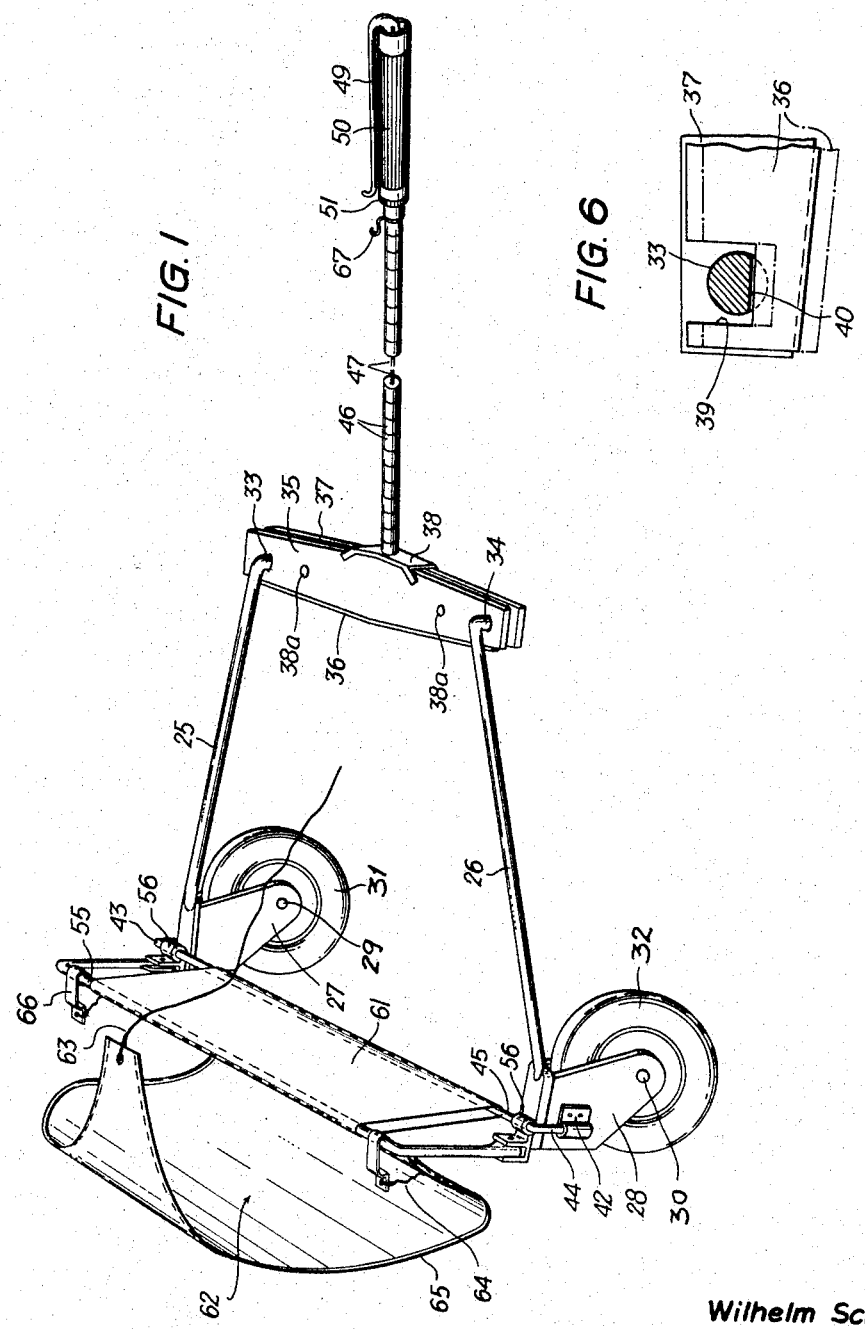
Wilhelm Schuster
INVENTOR.
BY
Karl G. Ross
Attorney April 2, 1968
W. SCHUSTER
3,376,047
COLLAPSIBLE VEHICLE
Filed June 15, 1966
3 Sheets-Sheet 2
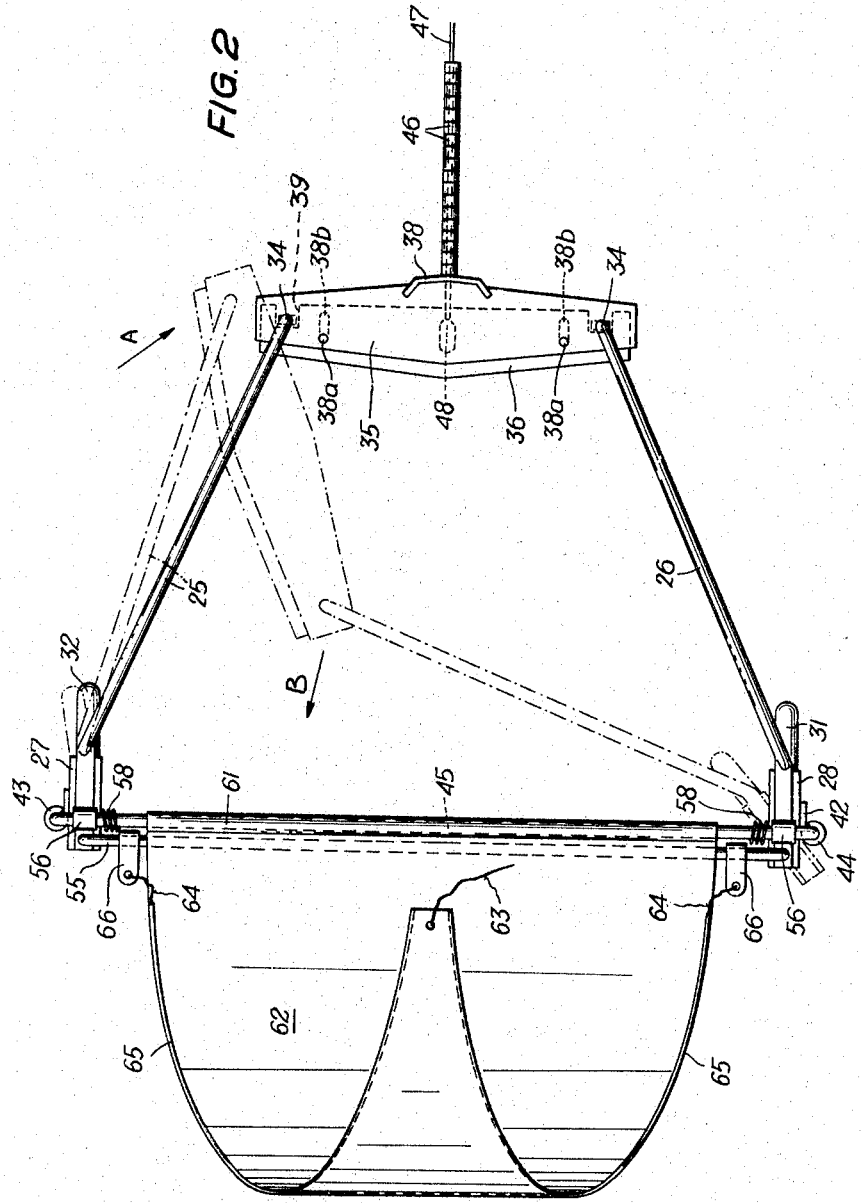
Wilhelm Schuster
INVENTOR.
BY
Karl F. Ross
Attorney

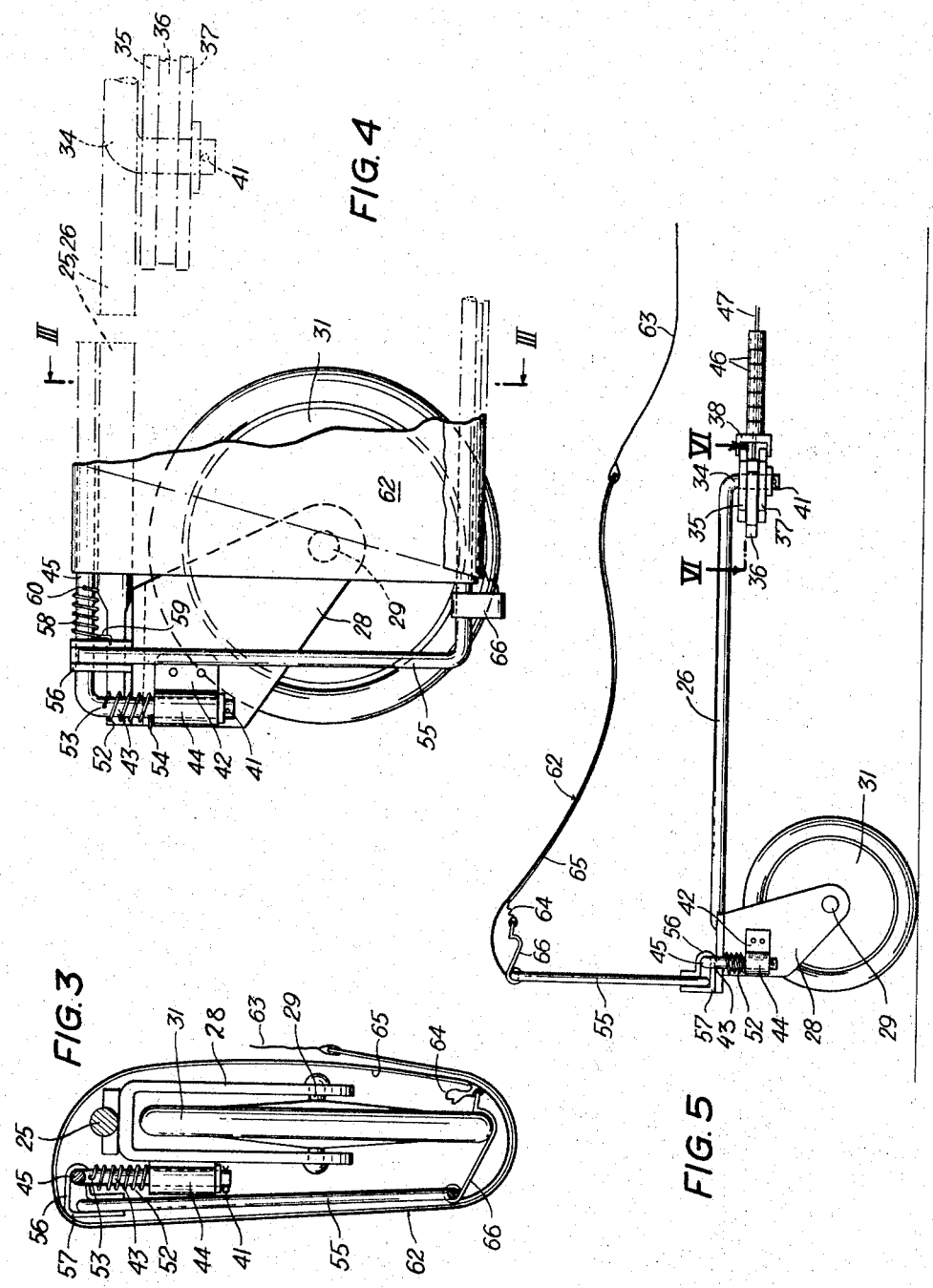

United States Patent Office 3,376,047
Patented Apr. 2, 1968

3,376,047
COLLAPSIBLE VEHICLE
Wilhelm Schuster, Neubauzeile 57,
Linz (Danube), Austria
Filed June 15, 1966, Ser. No. 557,771
Claims priority, application Austria, June 16, 1965,
A 5,468/65
9 Claims. (Cl. 280—37)

ABSTRACT OF THE DISCLOSURE

A collapsible vehicle for the transportation of tools, suitcases, shopping bags, sport equipment, etc., which includes a frame of isosceles trapezoidal configuration defined by hingedly interconnected member cooperating with a support and a releasable latch, the front and rear members having a total length equal to the combined length of the size of the trapezoid, which is swingable so that the members can lie substantially parallel to one another.

My present invention relates to a collapsible vehicle adapted to be used for the transportation of tools, suitcases, shopping bags, sporting equipment and other articles or even, if desired, of human beings (e.g., for first-aid purposes).

An object of this invention is to provide a vehicle of this type which, when ready for use, forms a broad supporting surface yet which can be folded into a substantially flat inoperative position for the purpose of storage or easy transportation.

A more particular object of my invention is to provide a vehicle of this description which can be collapsed and expanded in a simple manner by an unskilled person, specifically without the need for removing and reinserting bolts, nuts or other fastening means.

A related object of the invention is to provide a collapsible vehicle which does not require the separate storage of auxiliary elements needed to place the equipment in condition for use.

These objects are realized, in conformity with my present invention, by the provision of a polygonal frame defined by a plurality of hingedly interconnected members including a transverse front member, a transverse rear member and a pair of lateral members, all these frame members being positionable parallel to one another by the simple expedient of relatively rotating the aforementioned transverse members through 180° within the plane of the polygon. Such rotation, advantageously carried out on the shorter one (usually the rear member) of the two transverse members, reduces the effective length of the two lateral members so as to make it approximately equal to the difference in length of the two transverse members, this difference being zero in the specific case in which the front and rear members are of the same length and the polygonal frame is substantially a square. Wheels or casters, or possibly other supporting means such as skids or pontoons, are attached to the frame, preferably to the lateral members thereof, to facilitate manual or automotive propulsion. Finally, the frame is provided with releasable latch means operable to secure its members against relative swinging and, in this manner, to maintain the polygonal shape of the frame when the vehicle is to be put to use.

The wheels or other frame-supporting means may be mounted on brackets which extend downwardly from the lateral frame members and lie in planes that are parallel to the direction of movement and therefore to each other; thus, if the frame is trapezoidal so that its two lateral members are relatively inclined, they will include an acute angle with their respective brackets which, however, ought to be so small that both the brackets and the lateral frame members will be nearly parallel to the front and rear members when the vehicle is collapsed.

The articulated frame members may be provided with resilient means, such as a pair of coil springs at the junctions of the front and lateral members, urging the frame to assume its polygonal shape; similar spring means may also be used for yieldably maintaining a yoke, swingably mounted on the front member, in an upstanding position in which it forms an end support for goods carried on the vehicle and from which it may be swung downwardly into a depending position wherein it may be secured by suitable catch means to the collapsed frame.

Pursuant to a further feature of my invention, one of the transverse members (preferably the rear member) includes a plurality of juxtaposed elements, such as flat plates, which are relatively shiftable parallel to the plane of the polygon and which are engaged by the aforementioned latch means for movement into and out of a clamping position wherein the joints between this transverse member and the two lateral members are "frozen" to prevent their relative displacement; to facilitate such "freezing," the lateral members have ends with non-circular (e.g., flattened) surfaces co-operating with complementary surfaces on one or more of the relatively shiftable elements which, in the clamping position, make contact under pressure from the latch means. The latter, advantageously, comprises a vehicular tongue or thrill in the shape of an articulated rod as disclosed in my U.S. Patent No. 2,822,896 and also in my pending application Ser. No. 457,363, filed May 20, 1965, i.e., a rod composed of contiguous body sections which are held together and maintained in pressure-transmitting relationship by one or more flexible tension means, such as cables, traversing these body sections against which they are tensionable by a swingable handle or similar locking means.

The invention is described in greater detail with reference to the accompanying drawing in which:

FIG. 1 is a perspective view of a collapsible vehicle representing a preferred embodiment;

FIG. 2 is a top plan view of the vehicle shown in FIG. 1 with a partly collapsed position of its frame indicated in dot-dash lines;

FIG. 3 is a cross-sectional view of the vehicle in its fully collapsed state, taken on the line III—III of FIG. 4;

FIG. 4 is a fragmentary front view of the collapsed vehicle;

FIG. 5 is a side-elevational view of the expanded vehicle; and

FIG. 6 is a detail view taken on the line VI—VI of FIG. 5 but drawn to a larger scale.

The carriage illustrated in the drawing comprises a collapsible frame (e.g., of aluminum) composed of a pair of lateral members 25, 26; a transverse front member or bail 45 of inverted-U shape; and a transverse rear member consisting of three superimposed plates 35, 36, 37. Members 25 and 26 are bars converging toward the rear to form the sides of a trapezoid; at the front, these bars are bent so that their extremities lie parallel to each other and include an obtuse angle with the major portion of each bar. The parallel front ends of the bars 25, 26 are respectively integral with a pair of depending brackets 27, 28 carrying axles 29, 30 on which a pair of wheels 31, 32 are coaxially journaled. The wheels 31, 32 are, accordingly, disposed in parallel planes and define the direction of travel of the vehicle.

In order to form a hinged connection between frame members 25, 26 and 45, the dependent extremities 43, 44 of the latter are articulated to the brackets 27, 28 by being rotatably received in a sleeve 42 thereon. The opposite, rearward end of each side bar 25, 26 is bent downwardly to form a stud 33, 34 which traverses a pair of aligned bores in top and bottom plates 35, 37 as well as a rectangular cutout 39 in the intervening plate 36 as best seen in FIG. 6; a cotter pin 41 prevents the withdrawal of the stud from the composite frame member 35–37. Each of the studs 33, 34 has a flat surface 40, as particularly illustrated for the stud 33 in FIG. 6, and is freely movable in that cutout when the plate 36 is shifted relatively to plates 35, 37 into a partly offset position illustrated in dot-dash lines in FIG. 6. In its alternate position, shown in full lines in FIG. 6, an edge of cutout 39 engages the stud surface 40 and prevents any rotation of bar 25 or 26 with reference to member 35–37. Plates 35 and 37 of this member are rigidly interconnected by pins 38a traversing slots 38b (FIG. 2) in the central plate 36 sandwiched therebetween, the length of these slots being sufficient to enable the relative shifting of the plates between the two positions illustrated in FIG. 6. Such shifting may be brought about by the actuation of a latching device here shown as a rod composed of annular body sections 46 which are traversed by a tension cable 47, the cable being anchored at one end to the plate 36 whereas the assembly of rod sections 46 bears upon the plates 35 and 37 through the intermediary of a pressure plate 38. Cable 47 can be tensioned against the rod sections 46 by means of a handle 50 which is connected at 51 to the rod section farthest from pressure plate 38 and which carries a toggle lever 49 anchored to the other end of the cable. The assembly 46–51 is generally similar to that described in my afore-mentioned U.S. Patent No. 2,822,896 and operates in the same manner, i.e., the cable 47 is stressed when the lever 49 is in its illustrated position alongside handle 50; to slacken the cable, this lever merely needs to be swung outwardly about its pivot 49a at the outer end of handle 50.

It will now be apparent that, upon a release of the tension of cable 47 as described above, plate 36 is free to shift with reference to plate 35, 37 so as to unclamp the ends 33, 34 of bars 25, 26 whereupon the trapezoidal vehicle frame can be collapsed by a rotation of member 35–37 through approximately 180° as indicated by arrows A and B in FIG. 2. Upon completion of this rotation, the free members 25, 26, 35–37 come to rest against the longer members front member 45 in a position substantially parallel thereto, this being the position illustrated in FIGS. 3 and 4 in which the brackets 27, 28 are also disposed approximately parallel to the plane of bail 45. Coil springs 52, surrounding the extremities 43, 44 of the bail, are anchored to the latter at one end 53 and to its corresponding bracket 27, 28 at their opposite end 54; these coil springs are so biased as to tend to swing the bars 25, 26 back into the operative position of FIGS. 1 and 2 from their folded-up position of FIGS. 3 and 4.

From the geometry of the trapezoid 25, 26, 35–37, 45 it will be apparent that, in order to permit a folding of the frame in the manner just described, the sum of the effective lengths of the bases (45, 35–37) must substantially equal the sum of the effective lengths of the sides (25, 26). It will usually be convenient to make the rear member 35–37 the minor base of the trapezoid, but this is not absolutely necessary. In fact, as noted earlier, the frame could also have a square outline.

In order to provide an end support for articles carried on the vehicle, a yoke 55 is swingably mounted on the bail 45 with the aid of a pair of hinges 56 which are traversed by the straight portion of member 45 and are formed by strips 57 embracing the free ends of the yoke. Springs 58, coiled around the horizontal portion of members 45, engage that member at one end 60 and are anchored at their other end 59 to the corresponding hinge strip 57 in a manner tending to swing the yoke 55 upwardly into the erected position shown in FIGS. 1 and 5. To hold the yoke in its downwardly swung position, a pair of latch fingers 56 are mounted on the horizontal bar of the yoke and are engageable with the rims of the folded-up wheels 31, 32, as seen in FIGS. 3 and 4. These fingers also serve as anchor points for a pair of cords 64 which project from the beaded edge of a generally triangular tarpaulin 62 secured thereby to the yoke 55. The tarpaulin further has a cord 63 by which its tip may be attached to a hook 67 projecting from one of the rod sections 46. When thus attached, the tarpaulin 62 protects the load of the vehicle which is further held in position by a sheet 61 spanning the horizontal portions of bail 45 and yoke 55. On the other hand, as illustrated in FIGS. 3 and 4, the tarpaulin can also be wrapped around the collapsed assembly. By virtue of its connection with the detents 66, the tarpaulin may also serve as a means for concurrently disengaging both these detents from the wheels 31, 32 to release the collapsed assembly and to enable its return to its expanded position under the control of springs 53, 58.

The rod structure 46–51, when tensioned, will serve as a thill or tongue for the guidance of the vehicle. When relaxed, the structure may be wrapped around the frame assembly together with tarpaulin 62 or coiled up within the tarpaulin.

The assembly shown and described may, of course, be modified in various structural details without departing from the spirit and scope of my invention except as limited in the appended claims.

I claim:

1. A collapsible vehicle comprising a frame of generally isosceles trapezoidal configuration defined by a plurality of hingedly interconnected members including a transverse front member, a transverse rear member and a pair of lateral members, said members being positionable substantially parallel to one another upon a relative rotation of said transverse members of about 180° within the plane of the trapezoid, said front and rear members constituting the bases of the trapezoid, the combined length of said bases being substantially equal to the combined length of the sides of the trapezoid defined by said lateral members; supporting means secured to said frame; and releasable latch means on said frame operable to secure said members against relative swinging, thereby maintaining the polygonal shape of said frame.

2. A vehicle as defined in claim 1 wherein said lateral members are provided with downwardly extending brackets disposed in parallel planes, said supporting means comprising a pair of wheels coaxially journaled on said brackets.

3. A vehicle as defined in claim 2 wherein said frame is provided with a yoke swingably mounted on said front member for movement between an upstanding position and a depending position, said yoke forming an end support for goods carried on said frame in said upstanding position and coming to rest adjacent said brackets in said depending position.

4. A vehicle as defined in claim 3 wherein said yoke is provided with spring means tending to hold it in said upstanding position, said spring means being anchored to said frame, said yoke further having catch means for retaining it in said depending position against the force of said spring means.

5. A vehicle as defined in claim 4 wherein said catch means comprises a pair of lugs engageable with the rims of said wheels in a collapsed state of said frame.

6. A vehicle as defined in claim 3, further comprising a flexible sheet attached to said yoke and adapted to be wrapped about said yoke and said frame in a collapsed state of the latter.

7. A vehicle as defined in claim 2 wherein said front member has dependent extremities articulated to said brackets, further comprising resilient means engaging said front member and said brackets for urging said frame to assume its generally trapezoidal configuration.

8. A vehicle as defined in claim 1 wherein one of said transverse members includes a plurality of juxtaposed elements relatively shiftable parallel to the plane of the trapezoid, said lateral members having ends with non-circular surfaces traversing said elements and cooperating with complementary surfaces on at least one of said elements for immobilization of said lateral members relatively to said one transverse member upon a shifting of said elements into a predetermined clamping position, said latch means engaging said elements for moving them into and out of said clamping position.

9. A vehicle as defined in claim 8 wherein one transverse member is said rear member, said latch means comprising a vehicular tongue composed of contiguous body sections in pressure-transmitting relationship, flexible tension means traversing said body sections and locking means for stressing said tension means against said body sections, said relatively shiftable elements being respectively secured to said tongue and said tension means.

References Cited

UNITED STATES PATENTS

| | | | |
|---|---|---|---|
| 27,189 | 2/1860 | Lamb | 280—36 |
| 2,822,896 | 2/1958 | Schuster | 52—108 |
| 3,043,603 | 7/1962 | Major | 280—40 |
| 3,241,852 | 3/1966 | Muller et al. | 280—40 |

LEO FRIAGLIA, *Primary Examiner.*

BENJAMIN HERSH, *Examiner.*

J. SIEGEL, *Assistant Examiner.*